United States Patent
Yokoyama et al.

[11] Patent Number: 5,938,858
[45] Date of Patent: Aug. 17, 1999

[54] CLEANING METHOD FOR A VIDEOTAPE RECORDER EMPLOYING A CLEANING LIQUID

[75] Inventors: Naoki Yokoyama, Miyagi; Taiichiro Yoshimoto, Tokyo, both of Japan

[73] Assignees: Sony Corporation; Taiseishokai Co. Ltd., both of Tokyo, Japan

[21] Appl. No.: 09/021,827

[22] Filed: Feb. 11, 1998

[30] Foreign Application Priority Data

Feb. 13, 1997 [JP] Japan ................. P09-029350

[51] Int. Cl.$^6$ ................. B08B 1/02; B08B 3/04
[52] U.S. Cl. ................. 134/9; 134/15; 134/32; 510/167
[58] Field of Search ................. 134/9, 15, 32; 510/167

[56] References Cited

U.S. PATENT DOCUMENTS

| | | | |
|---|---|---|---|
| 4,202,787 | 5/1980 | Davis | 134/38 |
| 4,213,870 | 7/1980 | Loran | 15/104.94 |

*Primary Examiner*—Zeinab El-Arini
*Attorney, Agent, or Firm*—Hill & Simpson

[57] ABSTRACT

A cleaning method for a video tape recorder (VTR) employs a cleaning liquid. The cleaning liquid is applied to a tape surface of a tape-shaped support. The tape surface then slides against a surface of a VTR component, such as a magnetic head surface, to clean the surface. The cleaning liquid is a mixture of perfluorocarbons having a boiling point of about 56° C. to about 155° C. The cleaning liquid may also contain a hydrocarbon based solvent and a fluorine based resin. The cleaning liquid acts to clean and to prevent redeposition of contaminants on the surface of VTR component.

16 Claims, 2 Drawing Sheets

CLEANING METHOD FOR A VIDEOTAPE RECORDER EMPLOYING A CLEANING LIQUID

BACKGROUND OF THE INVENTION

1. Field of the Invention

This invention relates to a cleaning liquid and a cleaning method for cleaning a magnetic head.

2. Description of the Related Art

The magnetic head loaded on a video tape recorder (VTR) tends to be scorched because magnetic powers dropped from the magnetic tape, dust and dirt from an external environment or the lubricant coated on a magnetic tape become affixed to the tape sliding surface of the magnetic head. The powdered foreign matter or scorched lubricant, if heaped, tend to affect the recording/reproducing characteristics of the magnetic head.

For cleaning the tape sliding surface of the magnetic head, a cleaning tape has so far been used.

This cleaning tape may be roughly classified into a wet type cleaning tape configured for coating the tape surface with a cleaning liquid, and a dry type cleaning tape configured for cleaning the tape surface by exploiting abrasion properties of the tape surface without using the cleaning liquid.

Of these, the wet type cleaning tape is widely used because it has a superior cleaning effect without affecting the head.

As the wet type cleaning tape, such a cleaning tape is known in which a cleaning liquid mainly composed of isopropyl alcohol is applied to a tape-shaped substrate having a cleaning layer formed on a film of vinyl-based resins. In addition, there is disclosed a wet type cleaning tape in Japanese Laying-Open publications 4-38712, 40349210 and 6-139531.

The cleaning liquids of the wet type cleaning tape, so far proposed, are, however, composed mainly of alcohol. The cleaning liquid, mainly composed of alcohol, while having a cleaning effect, consumes much time in drying, such that some time must elapse since cleaning until it becomes possible to use the VTR. Moreover, the cleaning liquid, left for prolonged time in an undried date, tends to be polluted in the interim. Also, since alcohol is inflammable, it must be handled with attention. In addition, it is likely to modify plastics or rubber.

Furthermore, the cleaning liquid, mainly composed of alcohol, tends to absorb water. If the moisture is present in the cleaning liquid, it is left after cleaning on the head, head cylinder or on the guide, thus causing sticking of the magnetic tape to the magnetic head. The moisture, thus left, also tends to oxidize the magnetic head, or allows dust and dirt to be again deposited on the magnetic head.

The cleaning liquid, capable of removing dust and dirt, is poor in the effect in preventing re-deposition thereof, such that the magnetic head or the guide tend to be contaminated in a short time after cleaning.

In the field of VTR, researches towards higher performance are proceeding, such that, in the case of a rotary head, for example, a large number of, such as ten or more, magnetic heads are loaded on a cylinder, and are run in rotation at a speed higher than 450 rpm. In such high performance structure, the cleaning is of critical importance because the pollution or moisture deposition on the head or the cylinder affect the VTR operation seriously. With this in view, it is mandatory to eliminate the above inconvenience and to develop a cleaning tape having a higher meritorious effect.

SUMMARY OF THE INVENTION

It is therefore an object of the present invention to provide a cleaning liquid and a cleaning method that are excellent in the cleaning effect, capable of preventing re-deposition of dust and dirt, free of the risk of inflammation and high in safety and that absorbs moisture to a lesser extent and can be dried in short time after cleaning.

In one aspect, the present invention provides a cleaning liquid composed mainly of a fluorine based solvent and boiling at 56° C. to 155° C.

In another aspect, the present invention provides a cleaning method including applying a cleaning liquid composed mainly of a fluorine based resin and boiling at 56° C. to 155° C. on the surface of a tape-shaped support and sliding the surface thus coated with the fluorine based resin against a surface being cleaned for cleaning the tape.

The fluorine based solvent is superior in the cleaning performance and in retentivity with respect to the surface of a magnetic head or the like being cleaned, thus assuring effective cleaning. Moreover, the fluorine based solvent is water-repellent and low in hygroscopicity so that it leaves no moisture on the surface being cleaned. Thus, there is no risk of the magnetic head being oxidized by the moisture derived from the cleaning liquid or of pollutants becoming attached again to the magnetic head.

In addition, since the cleaning liquid has its boiling point controlled to 56° C. to 155° C., it is dried immediately after cleaning. This suppresses deposition of pollutants during the non-drying time to a minimum, while enabling a tape recorder to be used in a shorter time after cleaning.

Also, the cleaning liquid is not inflammable and hardly modifies rubber, such as plastics, so that it can be handled easily.

DESCRIPTION OF PREFERRED EMBODIMENTS

Figure 1:
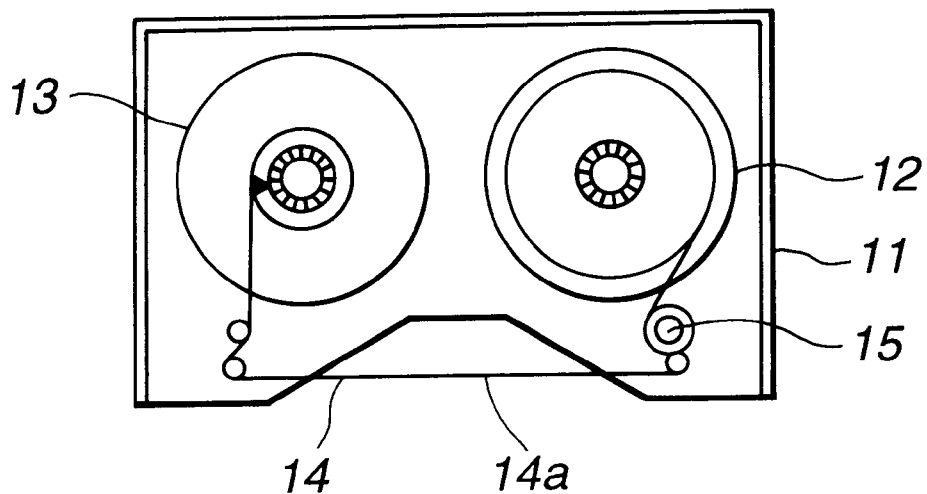
FIG. 1 is a schematic view showing an example of a cleaning cassette employing a cleaning liquid.

Referring to the drawings, preferred embodiments of the present invention will be explained in detail.

The cleaning liquid of the present invention is used for a wet type cleaning tape used for cleaning the magnetic head, head cylinder or the guide making up the tape recorder. It is composed mainly of a fluorine-based solvent and is controlled to boil at 56° C. to 155° C.

The fluorine-based solvent is superior in cleaning performance and in retentivity for the surface being cleaned, such as a magnetic head, so that it permits effective cleaning. Moreover, the fluorine-based solvent is water-repellent and low in hygroscopicity so that it leaves no moisture on the surface being cleaned. Thus, it is possible to prevent oxidation of the magnetic head or re-deposition of pollution thereon due to the moisture derived from the cleaning liquid.

Moreover, since the cleaning liquid is controlled to boil at 56° C. to 155° C., it is dried readily after cleaning. Thus, re-deposition of pollution during the non-dried time can be suppressed to a minimum, while the tape can be used in a shorter time after cleaning.

Also, the cleaning liquid is not inflammable and is not liable to modify rubber, such as plastics, so that it can be handled easily.

The fluorine-based solvent, as a main component of the cleaning liquid, may be enumerated by perfluorocarbon (PFC), hydrofluorocarbon (HFC), hydrofluoro ether (HFE) and perfluoro polyether of carboxylic acids. These may be used alone or in combination. Since the boiling point of the cleaning liquid is governed by the boiling point of the fluorine-based solvent, it is necessary to select the solvents so that the boiling point will be in a range of 56° C. to 155° C. The combination which gives this boiling point may be numerated by a mixture of PFC having 6 to 12 carbon atoms and other fluorine-based solvents, such as a mixed solvent of $C_7F_{16}$+HFC+$C_{12}F_{26}$ or a mixed solvent of HFE+HFC based solvent OFCPA (octafluoro cyclopentane)+$C_9F_{20}$+$C_{12}H_{26}$.

The cleaning liquid may be added to with fluorine compounds or hydrocarbon solvents so that part of the fluorine-based solvent will be held as a coating film on the head surface after drying to contribute to prevention of re-deposition of pollutants.

The fluorides may be enumerated by fluorine-based resins synthesized from ethylene tetrafluoride. In particular, the straight-chained structure is preferred. The fluorine-based resins may also contain functional groups introduced therein. These fluorine-based resins also operate for holding the coating film of the cleaning liquid and for improving the sliding properties of the head.

The hydrocarbon-based solvents may be enumerated by n-heptane, isopropyl alcohol, ethyl alcohol, hexane, cyclohexane, acetone, methylcyclohexane, ethyl cyclohexane, isoparaffin, n-paraffin and mineral terpene.

For cleaning the magnetic head or the like with such cleaning liquid, a cleaning cassette shown for example in FIG. 1 is readied.

This cleaning cassette is provided with a cleaning roll 15 for applying a cleaning liquid on a cassette 11 of the same size as the cassette for a tape recorder.

That is, this cleaning cassette includes a pay-out reel 12 and a take-up reel 13, housed within a cassette casing 11. A tape-shaped support (cleaning tape) 14, placed around the pay-out reel 12, travels from the pay-out reel 12 towards the take-up reel 13, as it is slid against the magnetic head in its course of travel.

In the present cassette, a cleaning roll 15 is provided between the pay-out reel 12 and a magnetic head sliding portion 14a. The cleaning roll 15 has fibers, such as a felt cloth, placed about the roll surface. For cleaning, these fibers are impregnated with the cleaning liquid.

For effectuating the cleaning by this cleaning cassette, the latter is loaded on the tape recorder and the tape-shaped support is run in the recording mode or in the playback mode. When the tape-shaped support is run, the tape-shaped support 14 reeled out from the pay-out reel 12 is contacted with the cleaning roll 15 at a position ahead of the magnetic head sliding portion 14a so that the cleaning liquid is transcribed from the cleaning roll 15 to the tape-shaped support 14. The tape-shaped support 14 then is slid against the magnetic head or various components of the tape running system for cleaning the head and the various components.

The support coated with the cleaning liquid may be of any type usually employed in a wet type cleaning tape.

Figure 2:
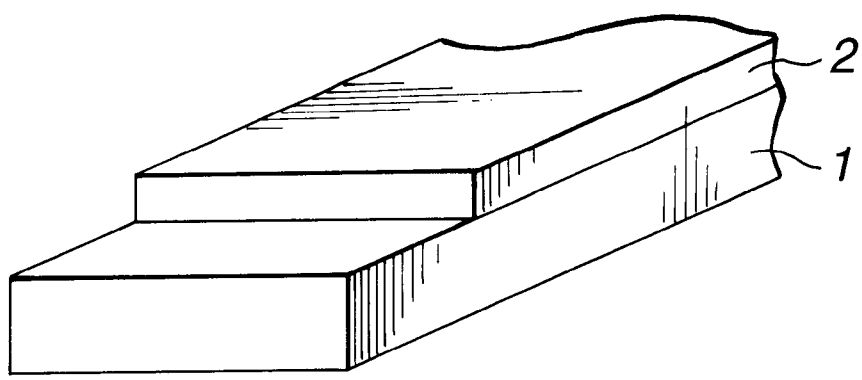
FIG. 2 is a perspective view showing an example of a support for a cleaning tape coated with a cleaning liquid.

For example, a high-molecular film (tape-shaped support) 1, formed of, for example, a vinyl-based resin or a polyester resin, may be coated on evaporation with a metal film or coated with a magnetic paint containing magnetic powders or a binder or a carbon paint containing carbon or a binder as a cleaning layer 2, as shown in FIG. 2. A non-woven fabric may also be used. If the film 1 coated with a metal film or a coating film is used, the cleaning liquid is applied on the film so as to be held as a coating film. The non-woven fabric holds the cleaning liquid by being impregnated between the fibers. If the coating film is formed by a carbon paint, the cleaning roll is optimum as a support because it affects the video head to a lesser extent while having a high holding power for the cleaning liquid.

Figure 3:
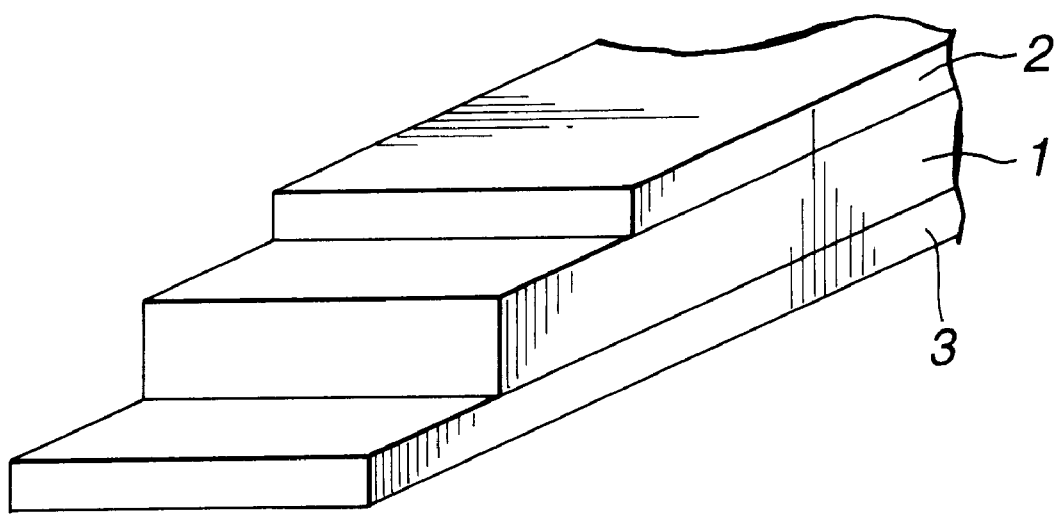
FIG. 3 is a perspective view showing another embodiment of a cleaning tape support.

A back-coating layer 3 may also be provided on the surface of the support opposite to the surface carrying the cleaning layer 2, as shown in FIG. 3.

The back-coating layer 3 operates for improving the sliding properties between the back surface of the tape and the tape running system, and is formed by applying and subsequently drying a coating liquid prepared by mixing and dispersing an anti-static agent such as carbon or an adhesive along with an organic solvent.

EXAMPLES

The present invention will now be explained with reference to Examples based on experimental results.

It should be noted that the following experimental examples 1-1 and 1-2 are directed to comparison between a cleaning liquid mainly composed of the fluorine-based solvent and the alcohol-based solvent, while the experimental examples 2-1 to 2-7 are directed to the check into the boiling point of the cleaning liquid and the experimental examples 3-1 to 3-3 are directed to the check into addition of the carbon-based solvent and the fluorine-based resin to the cleaning liquid.

Experimental Example 1-1

The procedure for producing a support for the cleaning tape is as follows:

First, components of the coating liquid for the cleaning layer were metered out in accordance with the following compositions. Composition of the coating liquid for the cleaning layer main powders, carbon black (manufactured by

| | |
|---|---|
| ASAHI CARBON under the trade name of #80 | 100 parts by weight |
| adhesive, vinyl chloride copolymer (manufactured by NIPPON ZEON under the trade name of MR-110 | 20 parts by weight |
| solvents | |
| methylethylketone | 260 parts by weight |
| toluene | 150 parts by weight |
| cyclohexanone | 100 parts by weight |

The main powders were mixed with the adhesive and dispersed in a ball mill with a proper amount of the solvent. The resulting mass was diluted with the remaining solvent and adjusted to a suitable solid content to prepare a coating liquid for the cleaning layer.

The coating liquid, thus prepared, was coated on a polyethylene terephthalate tape 10 μm thick to a coating thickness of 0.7 to 0.8 μm and dried to prepare a support for a cleaning tape.

The support for the cleaning tape, thus fabricated, was taken up on a cleaning set shown in FIG. 1. A felt cloth of the cleaning roll was then impregnated with a mixed solvent of $C_6F_{14}$ and $C_{12}F_{26}$ (fluorine-based cleaning liquid) in an amount of 0.1 to 0.2 ml and transcribed to the surface of the tape-shaped support for producing a cleaning tape. The boiling point of this cleaning liquid was 56° C.

Experimental Example 1-2

A cleaning tape was fabricated in the same way as in experimental example 1-1 except using isopropyl alcohol as a cleaning liquid.

Of the cleaning tape, thus fabricated, hygroscopicity and inflammability of the cleaning liquid and changes in the frictional coefficient of the head surface by the cleaning were checked. The results are shown in Table 1.

The hygroscopicity was evaluated by measuring the moisture in the cleaning liquid by a trace moisture measuring device manufactured by MITSUBISHI KASEI KOGYO under the trade name of MODEL CA-05.

On the other hand, changes in the fictional coefficient of the head surface were evaluated by comparing the VTR tape tension before and after coating of the cleaning liquid using a VTR for CAM manufactured by SONY CORPORATION under the trade name of BZW-75.

TABLE 1

| | cleaning liquid | frictional coefficient | moisture | inflammability |
|---|---|---|---|---|
| exp. ex. 1-1 | fluorine-based solvent | lowered | not present | not inflammable |
| exp. ex. 1-2 | alcohol-based Solvent | not changed | present | inflammable |

As shown in Table 1, the fluorine-based cleaning liquid is not hygroscopic nor inflammable, whereas the alcohol-based cleaning liquid is highly hygroscopic and inflammable. Therefore, the alcohol-based cleaning liquid has to be handled with minute attention. Moreover, it takes much time in drying, such that it takes two to five minutes since the end of cleaning until the VTR becomes usable.

On the other hand, while the fluorine-based cleaning liquid has the effect of reducing the frictional coefficient of the head surface, the alcohol-based cleaning liquid cannot reduce the frictional coefficient.

It is seen from this that the fluorine-based cleaning liquid is superior to the alcohol-based cleaning liquid as a cleaning liquid.

Experimental Examples 2-1 to 2-7

A cleaning tape was prepared in the same way as in experimental example 1-1 except adjusting the mixing ratio of $C_6F_{14}$ and $C_{12}F_{26}$ for changing the boiling point of the cleaning liquid within a range from 30° C. to 170° C.

The cleaning performance of the cleaning tape, thus prepared, was evaluated.

The cleaning performance was evaluated using a VTR for beta CAM as follows:

First, a magnetic tape liable to powder debris was run on the VTR for intentionally causing clogging of the magnetic head. Meanwhile, this magnetic tape is the usual magnetic tape from the magnetic layer of which carbon, abrasives and the lubricant have been removed. The cleaning tape was run for 5 seconds on the head and the head surface as well as the surface of the guide or rollers of the tape running system were checked over an optical microscope.

The state of the head or the running system not seen to be polluted, that seen to be polluted but to a usable level and that seen to be severely polluted to an unusable level, are denoted by ○, Δ and x, respectively. The results are shown in Table 2, along with the boiling points of the cleaning liquid.

TABLE 2

| | boiling point (° C.) | head cleaning effect | running system cleaning effect |
|---|---|---|---|
| exp. ex. 2-1 | 30 | x | x |
| exp. ex. 2-2 | 45 | Δ | Δ |
| exp. ex. 2-3 | 56 | ○ | ○ |
| exp. ex. 2-4 | 130 | ○ | ○ |
| exp. ex. 2-5 | 155 | ○ | ○ |
| exp. ex. 2-6 | 160 | Δ | Δ |
| exp. ex. 2-7 | 170 | Δ | x |

As shown in Table 2, the cleaning effect of the cleaning tape depends on the boiling point of the cleaning liquid. If the boiling point of the cleaning liquid ranges from 56° C. to 155° C., an optimum cleaning effect is derived. However, if the the boiling point of the cleaning liquid is lower than 56° C. or higher than 155° C., no sufficient cleaning effect is derived for the following reason.

First, if the boiling point of the cleaning liquid is lower than 56° C., the cleaning liquid is volatilized off during running of the cleaning tape such that the cleaning liquid is scarcely left on the support when actually the cleaning liquid is used for cleaning the tape. The result is that no sufficient cleaning effect is derived.

On the other hand, if the boiling point of the cleaning liquid is higher than 155° C., it takes some time since cleaning until the liquid is dried, such that the head, guide or the roll is transiently in the wetted state. During this time, the dust and dirt in the VTR become attached to the head, guide or the roll.

That is, for obtaining an optimum cleaning effect, the drying time after cleaning has to be shortened whilst drying of the cleaning liquid on the cleaning tape is suppressed to some extent. For this, the boiling point of the cleaning liquid has to be set in a range from 56° C. to 155° C.

Experimental Example 3-1

A cleaning tape was fabricated in the same way as in experimental example 1-1 except adding isopropyl alcohol and n-heptane to the cleaning liquid.

Experimental Example 3-2

A cleaning tape was fabricated in the same way as in experimental example 1-1 except adding a fluorine-based resin to the cleaning liquid. This fluorine-based resin is a polymer of ethylene tetrafluoride containing functional groups.

Experimental Example 3-3

A cleaning tape was fabricated in the same way as in experimental example 1-1 except adding isopropyl alcohol, n-heptane and a fluorine-based resin to the cleaning liquid. This fluorine-based resin is a polymer of ethylene tetrafluoride containing functional groups.

Of the cleaning tapes, fabricated as described above, the head cleaning effect and the effect of preventing re-deposition of pollutants on the head were evaluated.

The cleaning effect was evaluated as described above.

The effect of preventing re-deposition of pollutants was evaluated by first running the cleaning tape for five minutes in contact with the magnetic head, running a magnetic tape liable to powder debris as described above was then run in contact with the magnetic head and by subsequently observing the head surface with an optical microscope. The state of no pollutants becoming affixed to the head, the state of the head becoming apparently polluted to some extent but to an unobjectionable level, the state of the head becoming apparently polluted but to a practically usable level and the state of the head severely polluted to an unusable level, are denoted by ⊚, ○, Δ and x, respectively.

These results are also shown in Table 3. For comparison, similar evaluation was made on the cleaning tape of the experimental example 1-1, that is the cleaning tape not containing additives. The results are also shown in Table 3.

TABLE 3

|  | additive | head cleaning effect | re-pollution preventive effect |
| --- | --- | --- | --- |
| exp. ex. 1-1 | none | ○ | Δ |
| exp. ex. 3-1 | hydrocarbon based solvent | ○ | ⊚ |
| exp. ex. 3-2 | fluorine based resin | ○ | ⊚ |
| exp. ex. 3-3 | hydrocarbon based solvent and fluorine based resin | ○ | ⊚ |

As may be seen from Table 3, the cleaning tapes of the experimental examples 1-1 and 3-1 to 3-3 all give optimum cleaning effects. Of these, the cleaning tapes of the experimental examples 3-1 to 3-3, admixed with the fluorine based resin and the hydrocarbon based solvent, have been found to be effective in preventing re-deposition of pollutants.

From this, it is seen that addition of the hydrocarbon based solvent or the fluorine based resin is effective in preventing re-deposition of pollutants.

What is claimed is:

1. A cleaning method for a video tape recorder comprising the steps of:

preparing a cleaning liquid comprising a mixture of a plurality of perfluorocarbons having at least six to twelve carbon atoms, said mixture having a boiling point of from about 56° to about 155° C.;

providing a tape-shaped support having a tape surface;

applying the cleaning liquid to the tape surface; and sliding the tape surface having the cleaning liquid thereon against a head surface of a video tape recorder being cleaned for cleaning and preventing re-contamination of the head surface.

2. A cleaning method according to claim 1 wherein the cleaning liquid further comprises an alcohol and a hydrocarbon based solvent.

3. A cleaning method according to claim 1 wherein the cleaning liquid further comprises a fluorine based resin.

4. A cleaning method according to claim 1 wherein the cleaning liquid further comprises an alcohol, a hydrocarbon based solvent, and a fluorine based resin.

5. A cleaning method according to claim 1 wherein the tape-shaped support has a front tape surface on which the cleaning liquid is received when the cleaning liquid is applied to the tape surface.

6. A cleaning method according to claim 5 wherein the tape-shaped support further includes a back tape surface having a back coating layer disposed on said back tape surface.

7. A cleaning method for a video tape recorder comprising the steps of:

preparing a cleaning liquid comprising a mixture of a plurality of perfluorocarbons having at least six to twelve carbon atoms, said mixture having a boiling point from about 56° C. to about 155° C.;

providing a tape-shaped support having a tape surface and a cleaning roll having a fibrous surface;

applying the cleaning liquid to the fibrous surface of the cleaning roll;

sliding the tape surface against the fibrous surface so that the tape surface uniformly receives the cleaning liquid; and sliding the tape surface on which the cleaning liquid is applied against a head surface of a video tape recorder being cleaned.

8. A cleaning method according to claim 7 wherein the cleaning liquid further comprises an alcohol and a hydrocarbon based solvent.

9. A cleaning method according to claim 7 wherein the cleaning liquid further comprises a fluorine based resin.

10. A cleaning method according to claim 7 wherein the cleaning liquid further comprises an alcohol, a hydrocarbon based solvent, and a fluorine based resin.

11. A cleaning method according to claim 7 wherein the tape-shaped support has a front tape surface on which the cleaning liquid is received when the cleaning liquid is applied to the tape surface.

12. A cleaning method according to claim 11 wherein the tape-shaped support further includes a back tape surface having a back coating layer disposed thereon.

13. A cleaning method according to claim 7 wherein the fibrous surface comprises a felt cloth.

14. A cleaning method for a video tape recorder comprising the steps of:

preparing a cleaning liquid consisting essentially of a mixture of a plurality of perfluorocarbons having at least six to twelve carbon atoms, said mixture having a boiling point from about 56° C. to about 155° C.;

providing a tape-shaped support having a front tape surface and a cleaning roll having a fibrous surface;

applying the cleaning liquid to the fibrous surface of the cleaning roll;

sliding the front tape surface against the fibrous surface so that the front tape surface uniformly receives the cleaning liquid; and sliding the front tape surface against a head surface of a video tape recorder being cleaned.

15. A cleaning method according to claim 14 wherein the tape-shaped support further includes a back tape surface having a back coating layer disposed thereon.

16. A cleaning method according to claim 14 wherein the fibrous surface comprises a felt cloth.

* * * * *